United States Patent
Banks et al.

(10) Patent No.: US 12,380,053 B2
(45) Date of Patent: *Aug. 5, 2025

(54) SYSTEMS AND METHODS FOR CLOUD BASED PIN PAD DEVICE GATEWAY

(71) Applicant: Worldpay, LLC, Symmes Township, OH (US)

(72) Inventors: Walter Banks, Chandler, AZ (US); Christopher Guthrie, Phoenix, AZ (US)

(73) Assignee: Worldpay, LLC, Symmes Township, OH (US)

( * ) Notice: Subject to any disclaimer, the term of this patent is extended or adjusted under 35 U.S.C. 154(b) by 167 days.

This patent is subject to a terminal disclaimer.

(21) Appl. No.: 18/316,389

(22) Filed: May 12, 2023

(65) Prior Publication Data
US 2023/0281148 A1 Sep. 7, 2023

Related U.S. Application Data

(63) Continuation of application No. 17/213,080, filed on Mar. 25, 2021, now Pat. No. 11,687,481, which is a (Continued)

(51) Int. Cl.
*G06F 13/42* (2006.01)
*G06Q 20/20* (2012.01)
(Continued)

(52) U.S. Cl.
CPC ........... *G06F 13/42* (2013.01); *G06Q 20/202* (2013.01); *G06Q 20/4012* (2013.01); *H04L 67/141* (2013.01)

(58) Field of Classification Search
None
See application file for complete search history.

(56) References Cited

U.S. PATENT DOCUMENTS 6,311,165 B1 10/2001 Coutts et al.
8,407,768 B1 3/2013 Hayter
(Continued)

OTHER PUBLICATIONS

A. Solano, N. Duro, R. Dormido, P. González, "Smart vending machines in the era of internet of things", Future Generation Computer Systems, vol. 76, 2017, pp. 215-220, ISSN 0167-739X, (https://www.sciencedirect.com/science/article/pii/S0167739X1630475 (Year: 2017).*

(Continued)

*Primary Examiner* — Idriss N Alrobaye
*Assistant Examiner* — Dayton Lewis-Taylor
(74) *Attorney, Agent, or Firm* — Bookoff McAndrews, PLLC

(57) ABSTRACT

A method of processing payment transactions includes receiving a connection request from a client device, determining whether a gateway is available for the client device, creating a connection between the client device and a gateway, the gateway being a previously existing gateway or a newly generated gateway, creating a message filter for the client device on a message bus, listening for messages on the message bus and transmitting the message to the client device by way of the gateway upon finding a message on the message bus matching the message filter.

14 Claims, 8 Drawing Sheets

Related U.S. Application Data continuation of application No. 16/804,979, filed on Feb. 28, 2020, now Pat. No. 10,990,558, which is a continuation of application No. 15/662,580, filed on Jul. 28, 2017, now Pat. No. 10,614,021.

(51) Int. Cl.
  *G06Q 20/40* (2012.01)
  *H04L 67/141* (2022.01)

(56) References Cited

U.S. PATENT DOCUMENTS

| | | |
|---|---|---|
| 9,804,890 B1 | 10/2017 | Pai et al. |
| 2007/0255814 A1 | 11/2007 | Green et al. |
| 2007/0276763 A1 | 11/2007 | Kleinman et al. |
| 2008/0235358 A1 | 9/2008 | Moribe et al. |
| 2014/0067571 A1 | 3/2014 | Fricke et al. |
| 2014/0358777 A1 | 12/2014 | Gueh |
| 2015/0170126 A1 | 6/2015 | Gleeson et al. |
| 2015/0188888 A1 | 7/2015 | Kang et al. |
| 2016/0241633 A1 | 8/2016 | Overby, Jr. et al. |
| 2016/0294967 A1 | 10/2016 | Reveron et al. |
| 2018/0075445 A1 | 3/2018 | Pan et al. |
| 2018/0336548 A1 | 11/2018 | Crosby et al. |
| 2019/0014018 A1 | 1/2019 | Ramalingam et al. |

OTHER PUBLICATIONS

IBM, International Technical Support Organization, Patterns: SOA Design Using WebSphere Message Broker and WebSphere ESB, Jul. 2007, http://www.redbooks.ibm.com/redbooks/pdfs/sg247369.pdf.

* cited by examiner

SYSTEMS AND METHODS FOR CLOUD BASED PIN PAD DEVICE GATEWAY

CROSS-REFERENCE TO RELATED APPLICATION(S)

This patent application is a continuation of and claims the benefit of priority to U.S. application Ser. No. 17/213,080, filed Mar. 25, 2021, which is a continuation of U.S. application Ser. No. 16/804,979, filed Feb. 28, 2020, now U.S. Pat. No. 10,990,558, which is a continuation of U.S. application Ser. No. 15/662,580, filed Jul. 28, 2017, now U.S. Pat. No. 10,614,021, the entireties of which are incorporated herein by reference.

TECHNICAL FIELD

Various embodiments of the present disclosure relate generally to electronic payment infrastructure and, more particularly, to providing a scalable cloud-based device gateway.

BACKGROUND

Traditionally, merchants and other store owners have point of sale (POS) terminals and POS systems that can accept check or payment card payments from consumers for goods and services. Such POS systems may include PIN pads at which a consumer may enter payment and/or personal information in order to complete payment processing requests for purchases. Each PIN pad may connect to the merchant's payment processing through a gateway. If the PIN pad is stateless then a separate gateway with a direct connection to each PIN pad may be required, thus limiting the throughput and scalability of the merchant's payment processing system. This may cause inconvenience and dissatisfaction for the merchant and the merchant's customers, possibly resulting in decreased revenue for the merchant.

The present disclosure is directed to overcoming one or more of these above-referenced challenges.

SUMMARY OF THE DISCLOSURE

According to certain aspects of the disclosure, systems and methods are disclosed for processing payment transactions.

In one embodiment, a computer-implemented method is disclosed for processing payment transactions. The method includes: receiving a connection request from a client device, determining whether a gateway is available for the client device, creating a connection between the client device and a gateway, the gateway being a previously existing gateway or a newly generated gateway, creating a message filter for the client device on a message bus, listening for messages on the message bus and transmitting the message to the client device by way of the gateway upon finding a message on the message bus matching the message filter.

According to certain aspects of the disclosure, non-transitory computer readable media are disclosed storing a program causing a computer to execute a method of processing payment transactions, One method comprises: receiving a connection request from a client device, determining whether a gateway is available for the client device, creating a connection between the client device and a gateway, the gateway being a previously existing gateway or a newly generated gateway, creating a message filter for the client device on a message bus, listening for messages on the message bus and transmitting the message to the client device by way of the gateway upon finding a message on the message bus matching the message filter.

In accordance with another embodiment, a system is disclosed for processing payment transactions. The system comprises: a memory having processor-readable instructions stored therein; and a processor configured to access the memory and execute the processor-readable instructions, which when executed by the processor configures the processor to perform a plurality of functions, including functions to: receive a connection request from a client device, determine whether a gateway is available for the client device, create a connection between the client device and a gateway, the gateway being a previously existing gateway or a newly generated gateway, create a message filter for the client device on a message bus, listen for messages on the message bus; and upon finding a message on the message bus matching the message filter, transmit the message to the client device by way of the gateway.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that a variable number of stateless PIN pad client devices may maintain connections to a merchant's payment processing system. The disclosed systems and methods discussed below may allow greater throughput and scalability of the payment processing system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to providing a scalable cloud-based device gateway for processing payment transactions.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A merchant payment processing system may typically include one or more point of sale (POS) terminals in communication with one or more personal identification number (PIN) pads. Once a customer's transaction entered at the POS device is ready for completion, the POS device may send commands to a PIN pad for interaction with the customer to complete the transaction. This interaction may include presentation of payment credentials, such as a payment vehicle, and entry of customer identification, such as a PIN, biometric information, etc. Each POS device will maintain communication with the associated PIN pad in order to ensure that a customer can complete the transaction. Desirably, in order to allow a flexible association between a PIN pad and POS device, each PIN pad may connect to the merchant's payment processing system through a gateway. For example, the merchant's payment processing system may be accessible in a cloud environment rather than by a direct connection from the PIN pad. Thus, a PIN pad may not be directly linked with a particular POS device. However, it may be inefficient to provide a dedicated gateway for each PIN pad. Accordingly, as discussed in detail below, the merchant payment processing system may generate a new gateway on demand based on the needs of the merchant's POS devices and PIN pads.

Figure 6:
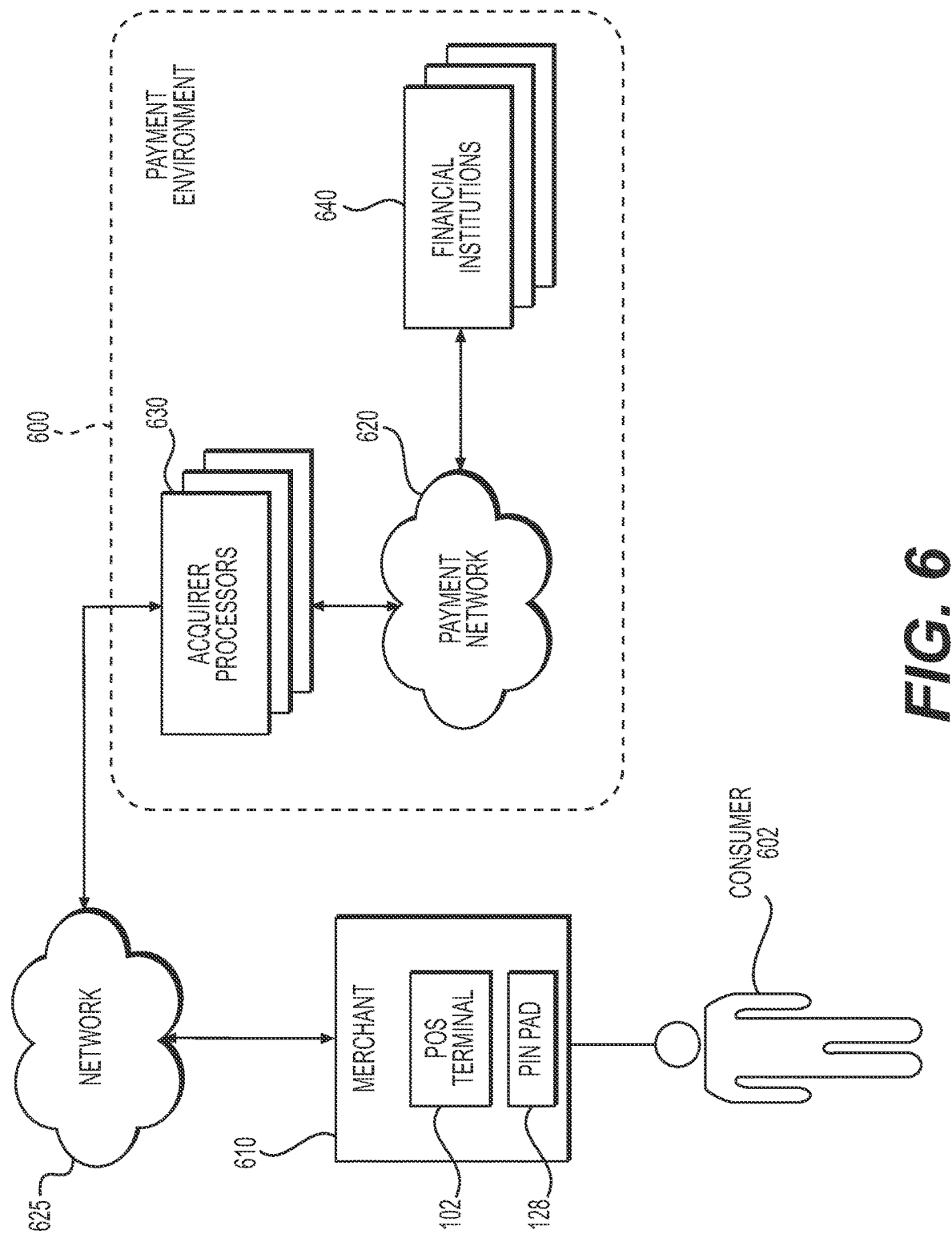
FIG. 6 depicts a block diagram of an electronic payment processing system.

As shown in FIG. 6, in an electronic payment processing system, a consumer 602, during the checkout process with a merchant 610, pays for goods or services from merchant 610 at a PIN Pad 128 associated with POS terminal 102. Consumer 602 may use a payment card as payment and the transaction is processed through a payment environment 600. Because merchant 610 generally can use a different bank or financial institution 640 than consumer 602, an acquirer processor 630 handles the financial transactions that transfer payment between the financial institution 640 of consumer 602 and that of merchant 610. Consumer 602 submits payment information at the PIN Pad 128 associated with POS terminal 102 of merchant 610, such as by swiping his or her payment card, inserting his or her chip-based payment card, through wireless near field communication (NFC), etc., or by any other suitable means. PIN Pad 128 sends a payment request by way of a computer network 625 to an acquirer processor 630. Alternatively, such a request may be sent by a component that controls a flow of a transaction, such as point of sale (POS) engine 250 depicted in FIG. 2. Acquirer processor 630 requests, by way of payment network 620, an electronic transfer of funds from the received funds to the financial institution 640 associated with merchant 610.

Figure 1:
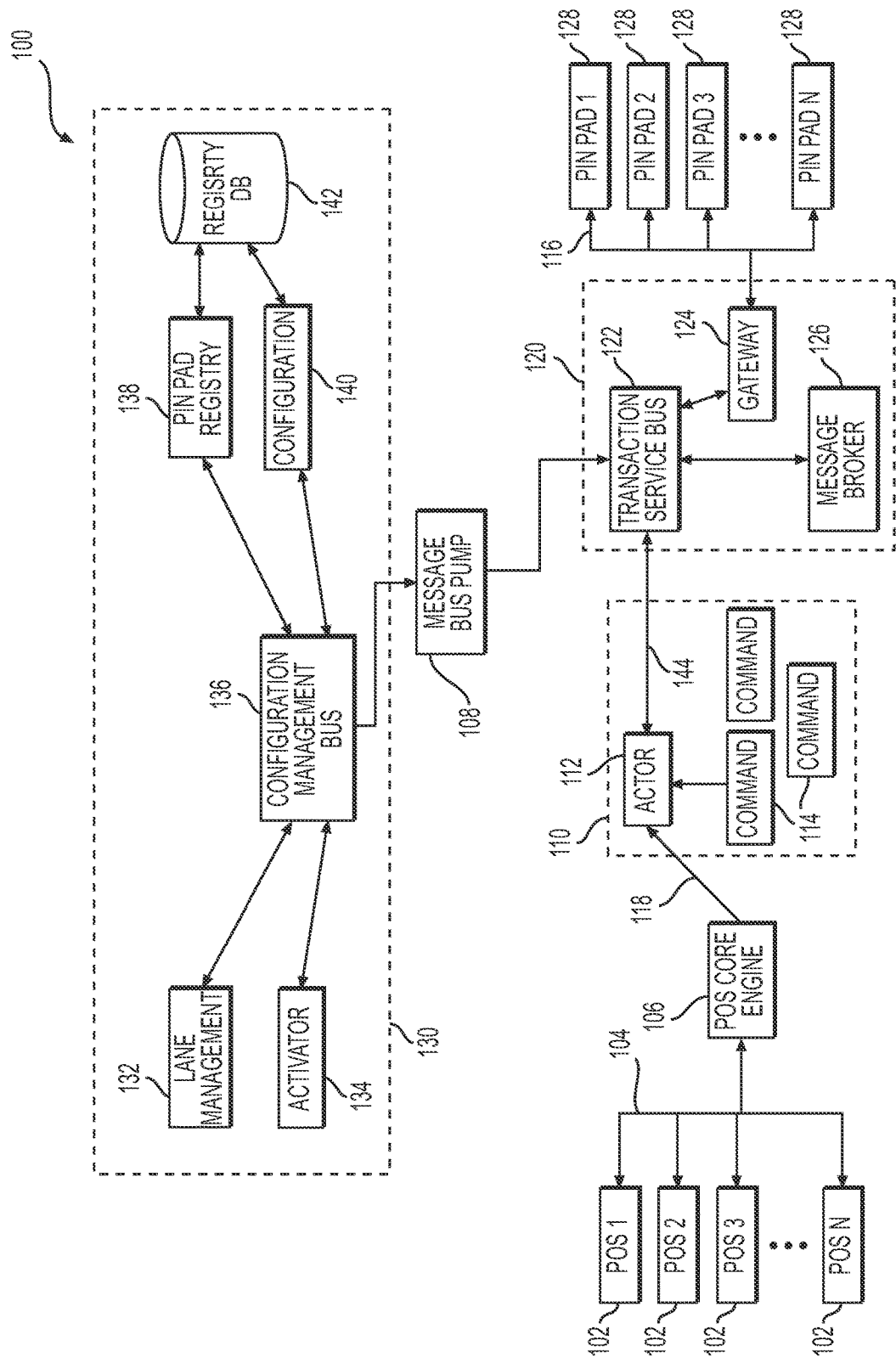
FIG. 1 depicts an exemplary system infrastructure for electronic payment transactions, according to one or more embodiments.
Figure 2:
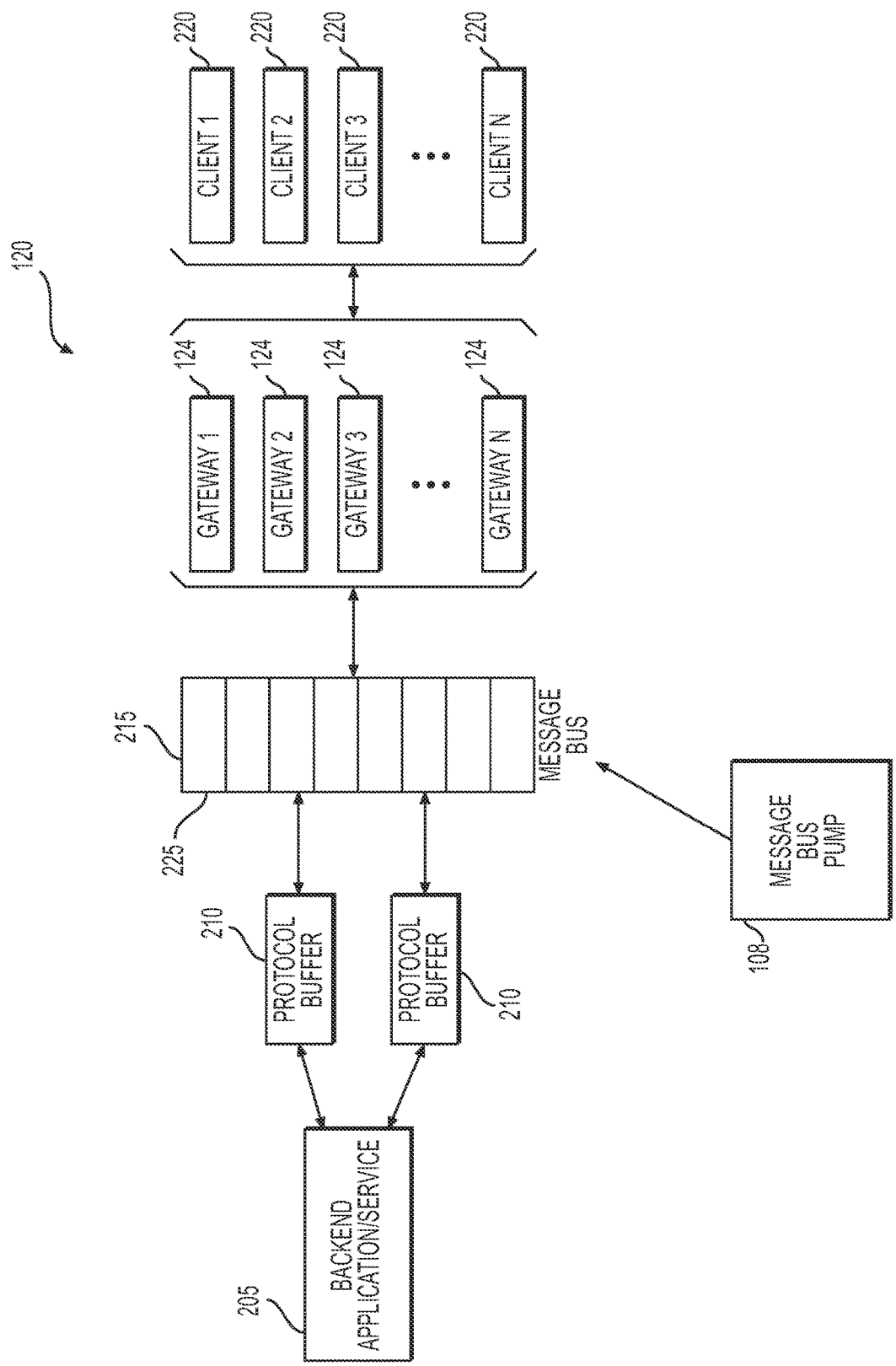
FIG. 2 depicts an exemplary system infrastructure for a cloud based device gateway, according to one or more embodiments.

Merchant 610 may provide an infrastructure for processing electronic payment requests. FIGS. 1 and 2 depict an exemplary system infrastructure for payment processing within a merchant environment, according to one or more embodiments.

As shown in FIG. 1, an infrastructure 100 for processing electronic payment requests may include one or more point of sale (POS) devices 102, which may be in communication with a POS engine 106, and one or more personal identification number (PIN) pad terminals 128, which may be in communication with a socket gateway 124. POS devices 102 may communicate a sale request message over computer network 104 to POS engine 106. POS engine 106 may be embodied, for example, as middleware that may transmit commands to control a PIN pad 128, such as by sending a payment request to PIN pad transaction generator 110 over computer network 118. PIN pad transaction generator 110 may generate one or more PIN pad commands 114 for processing by a transaction actor 112. Transaction actor 112 may take in a transaction request from the POS engine 106 and PIN pad specific commands 114 for the transaction. Transaction actor 112 may further take in expected responses from PIN pad 128. Transaction actor 112 may manage the entire transaction using, for example, a state machine for the specific transaction.

Infrastructure 100 for processing electronic payment requests may further include a PIN pad device gateway 120, which may provide commination with PIN pad terminals 128. PIN pad device gateway 120 may include a message broker that may process incoming sales transaction messages, a transaction service bus topic 122, and one or more device gateways 124. PIN pad device gateway 120 will be described in greater detail below with respect to FIG. 2.

As shown in FIG. 1, infrastructure 100 may further include a configuration management service 130, which may provide configuration services for PIN pad terminals 128. Configuration management service 130 may include a configuration service 140, a PIN pad registry 138 and a PIN pad database 142. Configuration service 140 may, if necessary, configure the PIN pad upon connection of the PIN pad to the infrastructure. PIN pad registry 138 and PIN pad database 142 may maintain data associating each PIN pad with an account or merchant. Configuration management service 130 may further include a lane management service 132 and a PIN Pad activator 134.

Infrastructure 100 may be embodied as a semi-integrated solution and may further control the PIN pad on behalf of the POS device software. Such control may include controlling a transaction flow or sequence including, for example, prompting for payment card swipe or insert, sending a transaction request for authorization, prompting for a consumer signature, etc.

Turning to FIG. 2, PIN pad device gateway 120 may include a message bus 215, which may receive messages from a backend application or service 205. The messages may be processed or published to the message bus by one or more protocol buffers 210. For example, protocol buffer 210 may translate the message from a communication protocol of backend application or service 205 to a communication protocol of message bus 215. Message bus 215 may store one or more message 225. Each message may comprise, in addition to the content of the message, additional items of metadata including, for example, a sender identity, a sender address, a sent date and time, a sent location, a recipient identity, a recipient address, a topic, access permissions for individual recipients or a group of recipients, etc.

Messages from backend application or service 205 may be intended, for example, for one of any number of client devices 220. For example, client device 220 may be a PIN pad, such as PIN pad 128 depicted in FIG. 1. Each client device 220 may access the merchant transaction processing system, including message bus 215, by way of a gateway 124. For example, client device 220 may be stateless and may connect to the merchant transaction processing system through gateway 124 by way of socket connections, which may be based on the client ID of client device 220. Connection details, such as the client ID of client device 220 may be stored in a cache, for example, maintained by gateway 124. Gateway 124 may then create a message filter on the message bus 215 if one does not exist, or it may update an existing message filter. The message filter may include identifying information of the recipient of the message, such as client device 220. For example, the message filter may include the client ID of client device 220, a message topic, a recipient address, etc. Such a message filter may be treated as a message topic subscription for retrieving messages. Alternatively, gateway 124 may listen for new messages and may read a new message if a recipient ID for the message matches a client ID stored in its cache. If a message is read by gateway 124 based on a match of the message filter or a recipient client ID, gateway 124 may transmit the message to the associated client device 220. Prior to transmitting the message to the associated client device 220, gateway 124 may, if desired, translate the message from a message bus communication protocol to a client device protocol. Alternatively, such a translation may be performed by an external process, such as by message bus pump 108.

If a response to the message is expected, the client that sent the original message may likewise register a topic subscription and listen for matching messages. For example, protocol buffer 210 may create a message filter on the message bus 215 if one does not exist, or it may update an existing message filter to include a client ID of backend application or service 205. Protocol buffer 210 may subsequently listen for new messages and may read a new message matching the message filter to be transmitted to backend application or service 205.

Message bus 215 may be controlled by or may have additional services performed by a message bus pump 108. For example, message bus pump 108 may translate messages from client or device communication protocols to the communication protocol of message bus 215. Message bus pump 108 may further register subscriptions for a client device or service such that messages meeting registered criteria are automatically retrieved from message bus 215. For example, a client device 220 may register a message topic subscription with message bus pump 108 such that when a message with the registered topic is stored on message bus 215, it is automatically retrieved and transmitted to the client device 220.

The merchant transaction processing system may include any number of client devices 220. However, it may be inefficient or inconvenient to maintain a dedicated gateway 124 for each possible client device 220. Accordingly, PIN pad device gateway 120 may generate a new gateway 124 only when the new gateway 124 is needed. For example, a new gateway 124 may be generated when a new client device 220 is connected to the merchant transaction processing system, or when an existing client device 220 becomes active, or when a message intended for an existing client device 220 is detected on message bus 215. PIN pad device gateway 120 may maintain a gateway 124 for each active client device 220 and may terminate gateway 124 when the associated client device 220 becomes inactive, thus maintaining the same number of gateways 124 and active client devices 220. Alternatively, PIN pad device gateway 120 may maintain a minimum number of gateways 124 that may be greater than the number of active client devices 220. This may allow a transaction to be processed using an existing gateway 124 without the delay of generating a new gateway 124. The newly generated gateway 124 may remain active even after the associated client device 220 becomes inactive, thus increasing the pool of available gateways 124. If the number of gateways 124 that are not associated with an active client device 220 exceeds a threshold then one or more gateways 124 may be terminated in order to free allocated resources.

Each gateway 124 may provide services for a single client device 220, as described above, or each gateway 124 may provide services for multiple client devices 220. In this case, a newly connected or activated client device 220 may be associated with a gateway 124 having capacity to service an additional client device 220. If no gateway 124 has capacity to service an additional client device 220, then an additional gateway 124 may be generated when a new client device 220 is connected to the merchant transaction processing system, or when an existing client device 220 becomes active, or when a message intended for an existing client device 220 is detected on message bus 215. When a client device 220 becomes inactive, the associated gateway 124 may be open to providing services for an additional client device 220. If a gateway 124 is not servicing any client devices 220 then the gateway 124 may be terminated in order to free allocated resources, or the gateway 124 may be maintained in order to allow a transaction to be processed using the existing gateway 124 without the delay of generating a new gateway 124. If the total capacity of active gateways 124 to provide services to additional client devices 220 exceeds a threshold then one or more gateways 124 may be terminated in order to free allocated resources.

According to one or more embodiments, the components of infrastructure 100 may be connected by one or more computer networks, such as, for example a local area network (LAN) or a wireless network, such as, for example, a Wi-Fi network. However, other network connections among the components of infrastructure 100 may be used, such as, for example, a wide area network (WAN), the internet, or the cloud. According to one or more embodiments, the components of infrastructure 100 may operate to provide cloud based device gateway connection. Methods of cloud based device gateway connection will be discussed with respect to FIGS. 3-5 below. Functions of the components of infrastructure 100 will be described below with respect to exemplary methods for cloud based device gateway connection.

Figure 3:
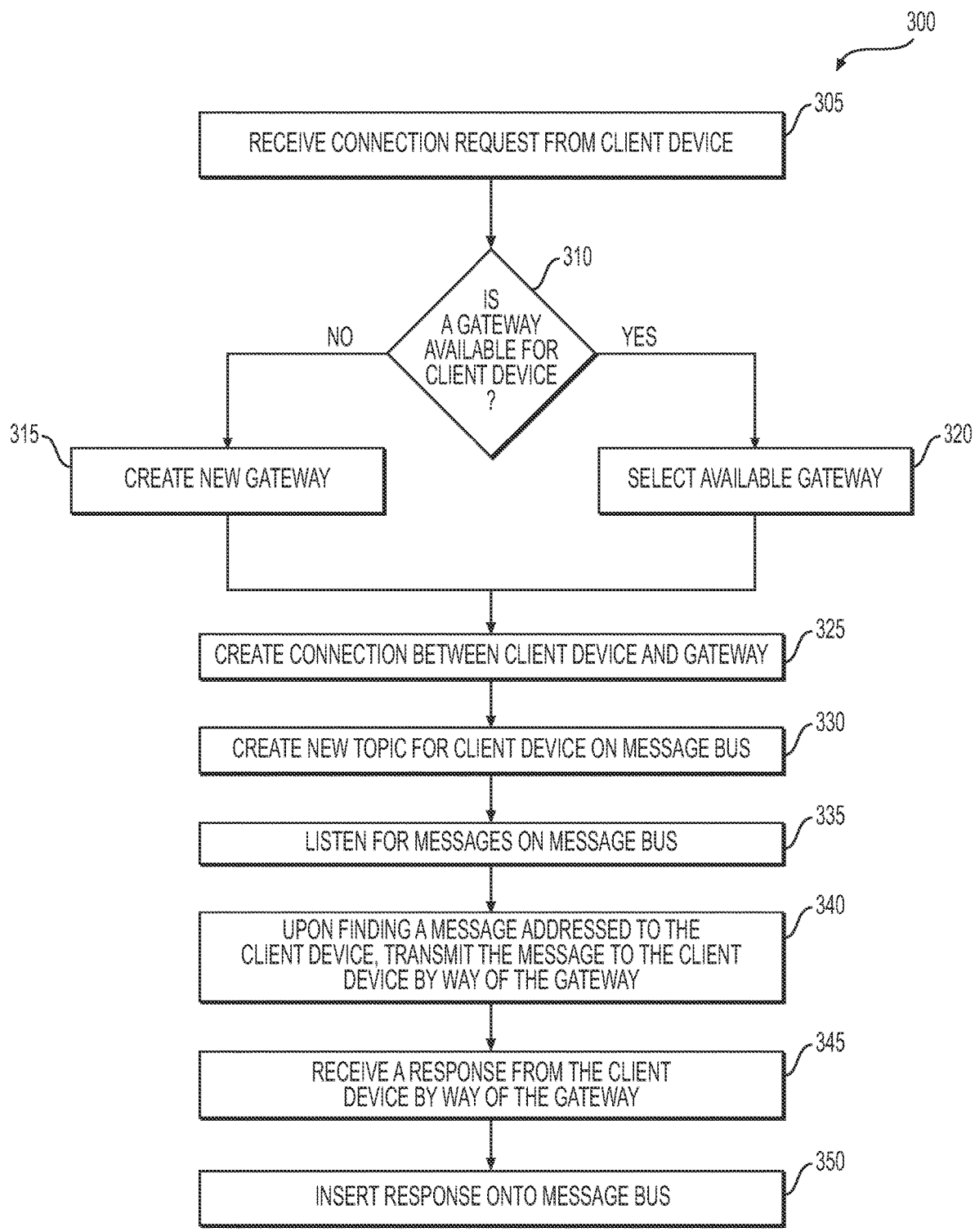
FIG. 3 depicts a flowchart of a method of cloud based device gateway connection, according to one or more embodiments.

FIG. 3 depicts a flowchart of a method of cloud based device gateway connection, according to one or more embodiments. Turning to FIG. 3, in operation 305, the cloud device gateway may receive a connection request from a client device, such as PIN pad 128 depicted in FIG. 1. In operation 310, the cloud device gateway may determine whether a socket gateway, such as PIN pad socket gateway 124 depicted in FIGS. 1 and 2, is available for the client device. If no socket gateway is available for the client device, then in operation 315, the cloud device gateway may create new socket gateway to be accessed by the client device. Alternatively, if no socket gateway is available for the client device, then in operation 320, the cloud device gateway may select an available socket gateway to be accessed by the client device. Once a socket gateway is available to be accessed by the client device, in operation 325, the cloud device gateway may create a connection between the client device and the socket gateway. In order to route messages to the client device, in operation 330, the cloud device gateway may create new topic for the client device, such as a topic subscription or on a message bus, such as transaction service bus 122 depicted in FIG. 1. Thereafter, in operation 335, the cloud device gateway may listen for messages on message bus, and upon finding a message addressed to the client device, in operation 340, the cloud device gateway may transmit the message to the client device by way of the socket gateway. In operation 345, the cloud device gateway may receive a response from the client device by way of the gateway, and in operation 350, the cloud device gateway may insert the response onto message bus to be routed to a destination device or process, as appropriate.

Figure 4A:
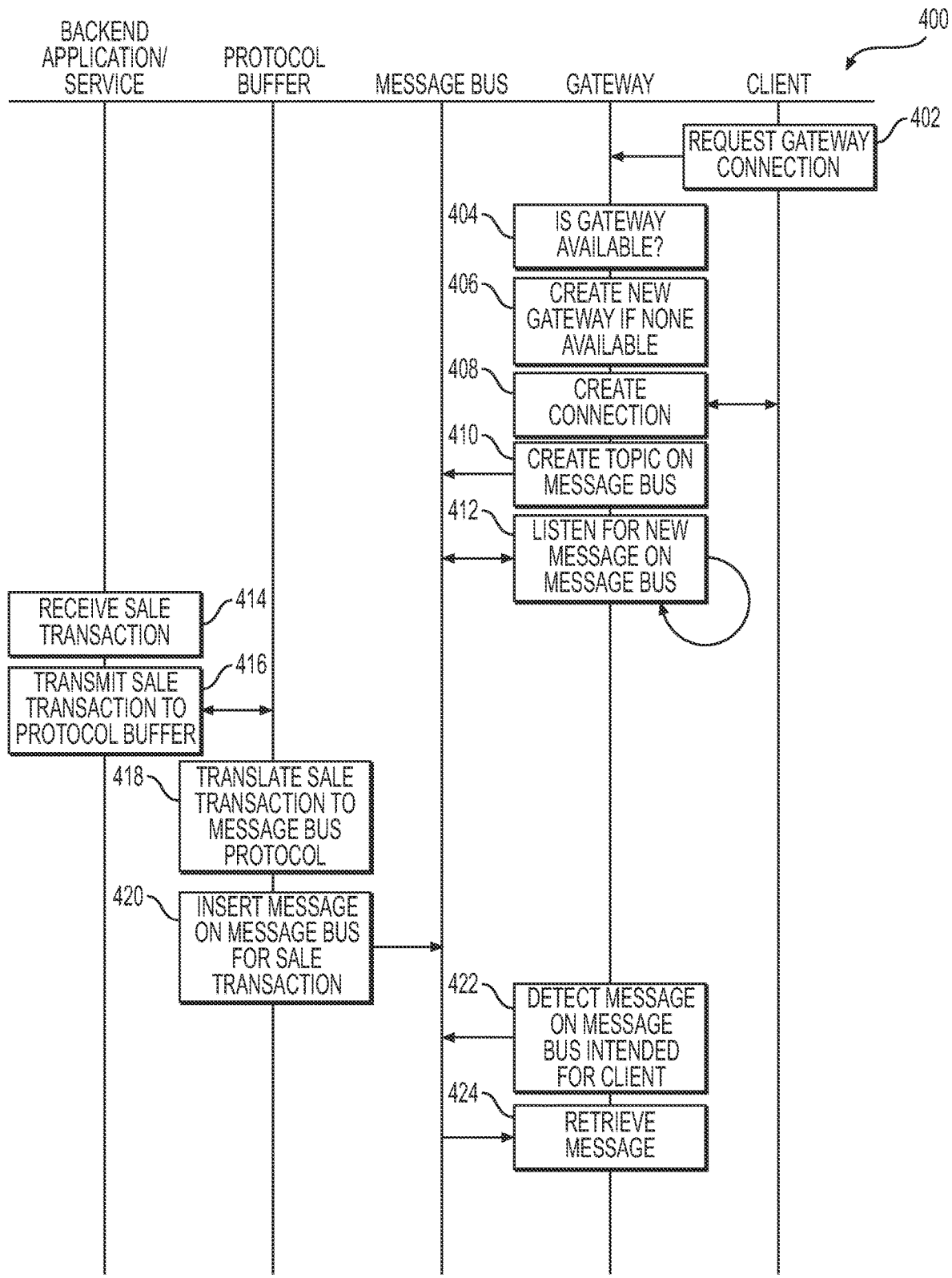
FIGS. 4A and 4B depict a communication flow diagram of a method of cloud based device gateway connection, according to one or more embodiments.
Figure 4B:
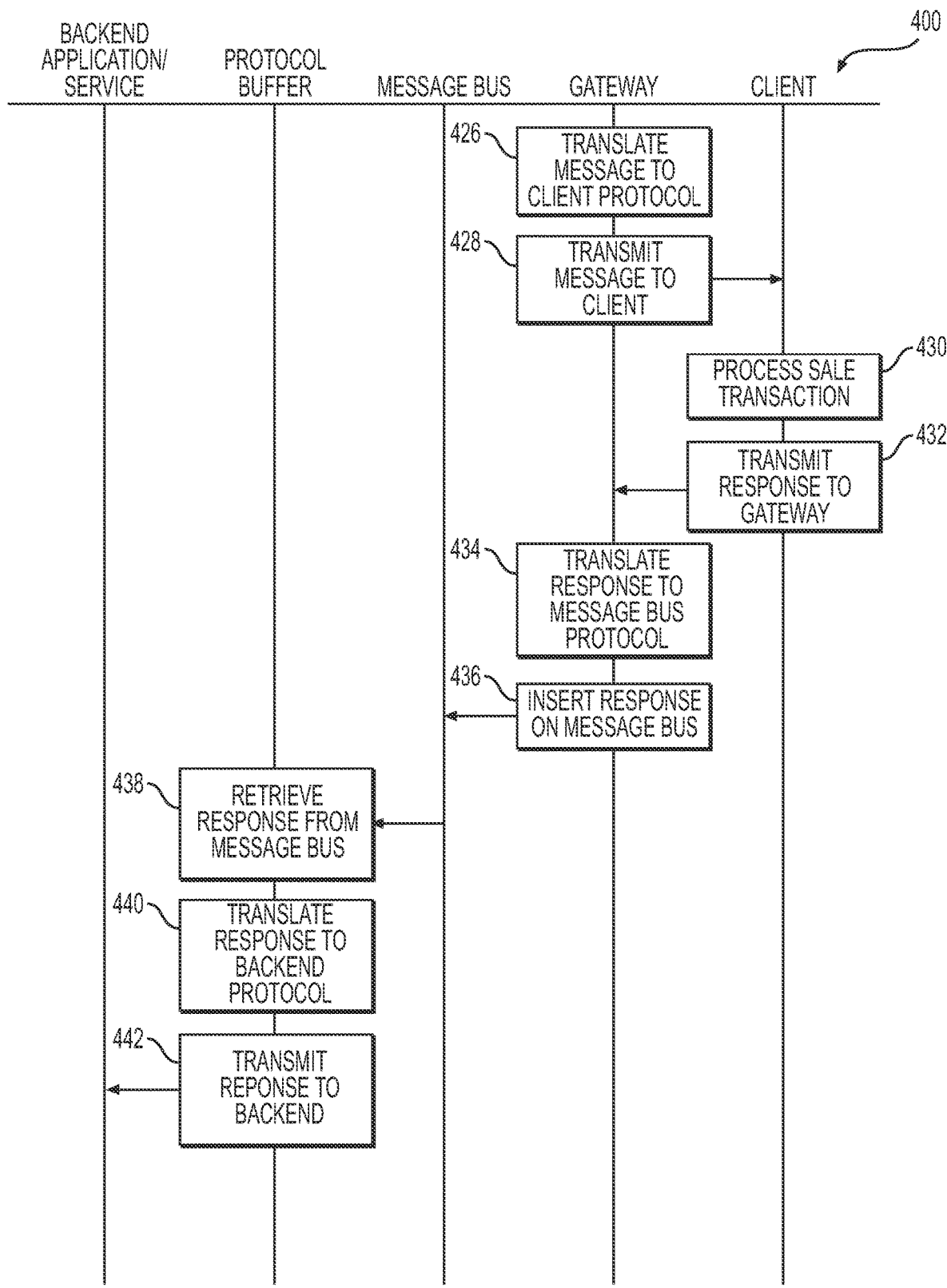

FIGS. 4A and 4B depict a communication flow diagram of a method of cloud based device gateway connection, according to one or more embodiments. As shown in FIGS. 4A and 4B, in operation 402, a client, such as PIN pad 128 depicted in FIG. 1, may request a gateway connection from a device gateway, such as cloud based device gateway 120 depicted in FIG. 1. In operation 404, the cloud device gateway may determine whether a socket gateway, such as PIN pad socket gateway 124 depicted in FIG. 1, is available for the client device. In operation 406, the cloud device gateway may create a new socket gateway if none is available. In operation 408, the cloud device gateway may create a connection between the client device and the socket gateway. In operation 410, the cloud device gateway may create new topic for the client device on a message bus, such as transaction service bus 122 depicted in FIG. 1. Thereafter, in operation 412, the cloud device gateway may listen for messages on the message bus. In operation 414, a backend application or service, such as PIN pad transaction generator 110 depicted in FIG. 1, may receive a sales transaction, such as from POS engine 106 depicted in FIG. 1. In operation 416, the backend application or service may transmit the sales transaction to a protocol buffer, such as protocol buffer 210 depicted in FIG. 2. In operation 418, the protocol buffer may translate the sale transaction to a message bus protocol. In operation 420, the protocol buffer may insert a message on the message bus for the sales transaction. In operation 422, the cloud device gateway may detect a message on the message bus intended for the client. In operation 424, the cloud device gateway may retrieve the message from the message bus. In operation 426, the cloud device gateway may translate the message to a client protocol. In operation 428, the cloud device gateway may transmit the message to the client. In operation 430, the client may process the sales transaction. In operation 432, the client may transmit a response to the cloud device gateway. In operation 434, the cloud device gateway may translate the response to the message bus protocol. In operation 436, the cloud device gateway insert the response on the message bus. In operation 438, the protocol buffer may retrieve the response from the message bus. In operation 440, the protocol buffer may translate the response to the backend protocol. In operation 442, the protocol buffer may transmit the response to the backend application or service.

Figure 5:
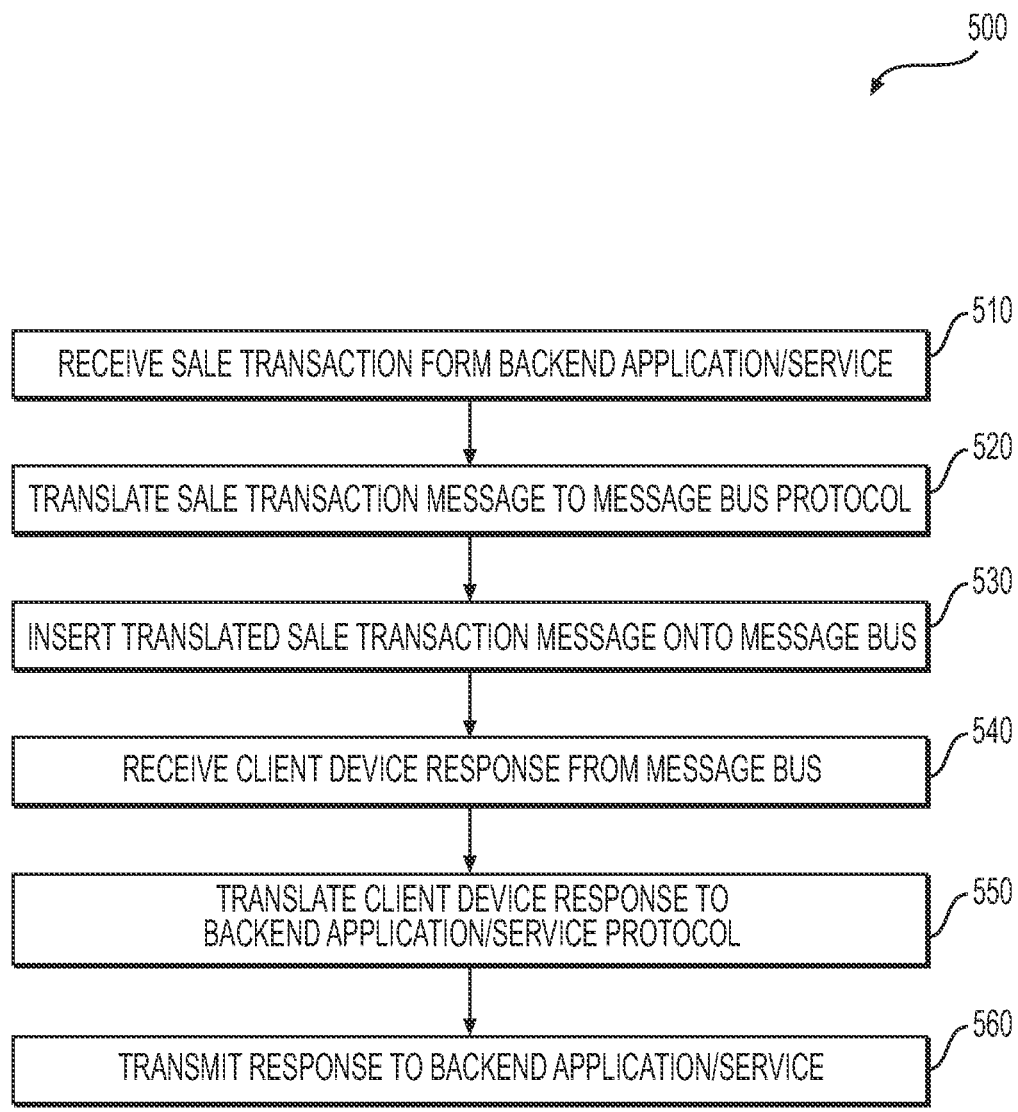
FIG. 5 depicts a flowchart of a method of cloud based device gateway connection, according to one or more embodiments.

FIG. 5 depicts a flowchart of a method of cloud based device gateway connection, according to one or more embodiments, which may be performed, for example, by a device gateway, such as cloud based device gateway 120 depicted in FIG. 1. As shown in FIG. 5, in operation 510, the device gateway may receive a sales transaction from a backend application or service, such as PIN pad transaction generator 110 depicted in FIG. 1. In operation 520, the device gateway may translate the sales transaction message to a message bus protocol. In operation 530, the device gateway may insert the translated sales transaction message onto a message bus, such as transaction service bus 122 depicted in FIG. 1. In operation 540, the device gateway may receive a client device response from message bus. In operation 550, the device gateway may translate the client device response to a backend application or service protocol. In operation 560, the device gateway may transmit the response to the backend application or service.

Any suitable system infrastructure may be put into place to provide a cloud based device gateway. FIGS. 1, 2, 6, and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1, 2 and 6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The systems and processes described above may be performed on or between one or more computing devices.

Figure 7:
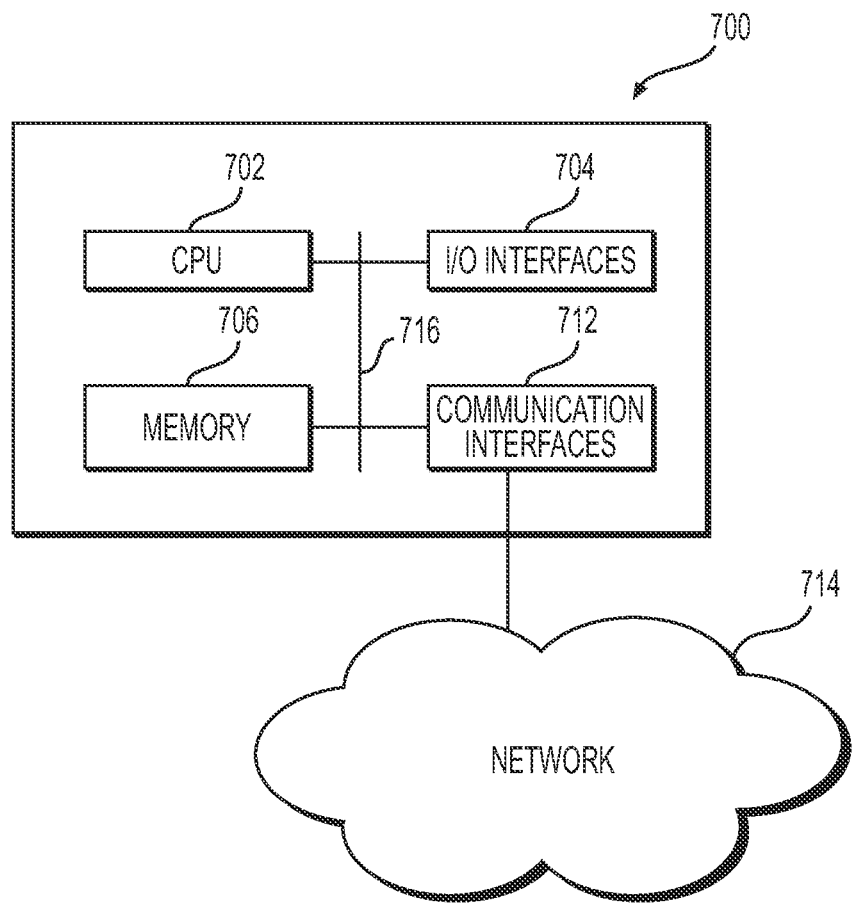
FIG. 7 is a block diagram of an example computing environment, according to one or more embodiments.

FIG. 7 illustrates an example computing device. A computing device 700 may be a server, a computing device that is integrated with other systems or subsystems, a mobile computing device such as a smart phone, a cloud-based computing ability, and so forth. The computing device 700 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 700 includes a processor 702 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 700 also includes one or more memories 706, for example read-only memory (ROM), random access memory (RAM), cache memory associated with the processor 702, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 700 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or Blu-ray disc, and so forth. Storage media such as flash drives, solid-state hard drives, redundant array of individual discs (RAID), virtual drives, networked drives and other memory means including storage media on the processor 702, or memories 706 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 708 may be configured to transmit to, or receive data from, other computing devices 700 across a network 712. The network and communication interfaces 708 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 708 may include wire data transmission links such as Ethernet and TCP/IP. The communication interfaces 708 may include wireless protocols for interfacing with private or public networks 712. For example, the network and communication interfaces 708 and protocols may include interfaces for communicating with private wireless networks such as Wi-Fi network, one of the IEEE 802.11x family of networks, or another suitable wireless network. The network and communication interfaces 708 may include interfaces and protocols for communicating with public wireless networks 708, using for example wireless protocols used by cellular network providers, including Code Division Multiple Access (CDMA) and Global System for Mobile Communications (GSM). A computing device 700 may use network and communication interfaces 708 to communicate with hardware modules such as a database or data store, or one or more servers or other networked computing resources. Data may be encrypted or protected from unauthorized access.

In various configurations, the computing device 700 may include a system bus 710 for interconnecting the various components of the computing device 700, or the computing device 700 may be integrated into one or more chips such as programmable logic device or application specific integrated circuit (ASIC). The system bus 710 may include a memory controller, a local bus, or a peripheral bus for supporting input and output devices 704, and communication interfaces 708. Example input and output devices 704 include keyboards, keypads, gesture or graphical input devices, motion input devices, touchscreen interfaces, one or more displays, audio units, voice recognition units, vibratory devices, computer mice, and any other suitable user interface.

The processor 702 and memory 706 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of processing payment transactions, comprising:
    determining whether a first gateway is available for a first stateless client device;
    determining whether the first gateway is available for a second stateless client device;
    upon determining that the first gateway is not available for both the first client device or the second client device, generating an additional gateway, wherein the additional gateway is generated when the second client device is connected to a downstream entity;
    creating a first connection between the first client device and the generated additional gateway;

creating a second connection between the second client device and the generated additional gateway;
transmitting a first message to the first client device by way of the generated additional gateway;
transmitting a second message to the second client device by way of the generated additional gateway; and
upon determining the first gateway and the generated additional gateway exceed a threshold of a total capacity of active gateways available for the first client device and the second client device, terminating one or more of the first gateway or the generated additional gateway.

2. The method of claim 1, the method further comprising:
creating a message filter for the first client device on a message bus;
listening for messages on the message bus; and
upon finding a message on the message bus matching the message filter for the first client device, translating the message from a message bus communication protocol to a communication protocol of the first client device.

3. The method of claim 2, wherein the message filter matches one or more of a message topic, a client device identifier, a recipient identity, and a recipient address.

4. The method of claim 1, wherein the generated additional gateway is terminated after the first client device and/or the second client device associated with the generated additional gateway disconnects from the generated additional gateway or is terminated.

5. The method of claim 1, wherein state information for each of the first client device and the second client device, including an address of a point of sale (POS) device associated with the first client device or the second client device, is stored on the generated gateway.

6. A computer system for processing payment transactions, the system comprising:
a memory having processor-readable instructions stored therein; and
a processor configured to access the memory and execute the processor-readable instructions, which when executed by the processor configures the processor to perform operations comprising:
determining whether a first gateway is available for a first stateless client device;
determining whether the first gateway is available for a second stateless client device;
upon determining that the first gateway is not available for both the first client device or the second client device, generating an additional gateway, wherein the additional gateway is generated when the second client device is connected to a downstream entity;
creating a first connection between the first client device and the generated additional gateway;
creating a second connection between the second client device and the generated additional gateway;
transmitting a first message to the first client device by way of the generated additional gateway;
transmitting a second message to the second client device by way of the generated additional gateway; and
upon determining the first gateway and the generated additional gateway exceed a threshold of a total capacity of active gateways available for the first client device and the second client device, terminating one or more of the first gateway or the generated additional gateway.

7. The computer system of claim 6, wherein the operations further comprise:
creating a message filter for the first client device on a message bus;
listening for messages on the message bus; and
upon finding a message on the message bus matching the message filter for the first client device, translating the message from a message bus communication protocol to a communication protocol of the first client device.

8. The computer system of claim 7, wherein the message filter matches one or more of a message topic, a client device identifier, a recipient identity, and a recipient address.

9. The computer system of claim 6, wherein the generated additional gateway is terminated after the first client device and/or the second client device associated with the generated additional gateway disconnects from the generated additional gateway or is terminated.

10. A non-transitory computer readable medium storing a program causing a computer to execute a method of processing payment transactions, the method comprising:
determining whether a first gateway is available for a first stateless client device;
determining whether the first gateway is available for a second stateless client device;
upon determining that the first gateway is not available for both the first client device or the second client device, generating an additional gateway, wherein the additional gateway is generated when the second client device is connected to a downstream entity;
creating a first connection between the first client device and the generated additional gateway;
creating a second connection between the second client device and the generated additional gateway;
transmitting a first message to the first client device by way of the generated additional gateway;
transmitting a second message to the second client device by way of the generated additional gateway; and
upon determining the first gateway and the generated additional gateway exceed a threshold of a total capacity of active gateways available for the first client device and the second client device, terminating one or more of the first gateway or the generated additional gateway.

11. The non-transitory computer readable medium according to claim 10, the method further comprising:
creating a message filter for the first client device on a message bus;
listening for messages on the message bus; and
upon finding a message on the message bus matching the message filter for the first client device, translating the message from a message bus communication protocol to a communication protocol of the first client device.

12. The non-transitory computer readable medium according to claim 11, wherein the message filter matches one or more of a message topic, a client device identifier, a recipient identity, and a recipient address.

13. The non-transitory computer readable medium according to claim 10, wherein state information for each of the first client device and the second client device, including an address of a point of sale (POS) device associated with the first client device or the second client device, is stored on the generated gateway.

14. The non-transitory computer readable medium according to claim 10, wherein the generated additional gateway is terminated after the first client device and/or the second client device associated with the generated additional gateway disconnects from the generated additional gateway or is terminated.

* * * * *

UNITED STATES PATENT AND TRADEMARK OFFICE
CERTIFICATE OF CORRECTION

Page 1 of 1

PATENT NO.         : 12,380,053 B2
APPLICATION NO.    : 18/316389
DATED              : August 5, 2025
INVENTOR(S)        : Walter Banks and Christopher Guthrie It is certified that error appears in the above-identified patent and that said Letters Patent is hereby corrected as shown below:

On the Title Page

In Column 2, Other Publications, Line 5, Delete
"(https://www.sciencedirect.com/science/article/pii/S0167739XI630475" and insert
"https://www.sciencedirect.com/science/article/abs/pii/S0167739X16304757".

Signed and Sealed this
Fourteenth Day of October, 2025

John A. Squires
*Director of the United States Patent and Trademark Office*